May 28, 1968     A. A. A. SWANSON     3,385,442

INLET FITTING FOR DRAIN TILES

Filed July 1, 1966

INVENTOR.
ANDREW A. A. SWANSON
BY Merchant & Gould
ATTORNEYS

United States Patent Office 3,385,442
Patented May 28, 1968

3,385,442
INLET FITTING FOR DRAIN TILES
Andrew A. A. Swanson, 926 E. 5th St.,
Willmar, Minn. 52601
Filed July 1, 1966, Ser. No. 562,236
2 Claims. (Cl. 210—163)

ABSTRACT OF THE DISCLOSURE

An inlet fitting for a drain tile having an upright whirlpool-preventing plate to be secured in the tile by means on the plate, conical screening means around the plate, to protect the entrance to the tile and indicator means extending upwardly therefrom.

---

This invention pertains to an inlet fitting for drain tiles of the type utilized in open agricultural fields and the like and more specifically to an inlet fitting which improves the drainage ability of the tiles.

In many agricultural type fields and road side areas drain tiles are installed having inlets at various low areas in the fields to aid the runoff of water during storms, spring thaws, etc. In general these inlets are simply vertical pieces of tile which communicate with the main underground horizontal tile. Because the inlets are circular when the water becomes relatively deep there is a tendency for the water to form a vortex or whirlpool at its center. This vortex in the inlet of the tile limits the amount of water that can flow into the tile to approximately one-third of the amount of water which can flow through the tile in a straight fall. Also, the whirling action of the water entering the inlet has a greater tendency to wash the surrounding earth and carries more dirt particles, etc., into the tile. In the prior art the inlets are simply covered with a grill or screen to prevent relatively large foreign objects from entering the tile. These prior art flat grills are quickly clogged with leaves, grass, etc., to greatly limit the amount of water which enters the inlet, thus, rendering the entire tile system practically useless.

The present device comprises an inlet fitting having a generally upright plate extending approximately diametrically across the inlet to prevent the formation of vortices in the inlet when the water therearound becomes relatively deep. In addition, the present device includes an inverted generally conical shaped helical member which forms a screen over the inlet to prevent relatively large objects from entering the tile. Because the screen is generally conical shaped there is a much larger area which must be covered by leaves, grass, and the like, before water is prevented from entering the inlet. The present device also has an easily exchangeable flag-like indicator which extends uprightly thereabove to indicate the presence of the inlet fitting. The indicator is easily exchangeable so that a higher indicator may be utilized in deep grass, deep water, etc. Also, the entire device is easily removable from the inlet for the passage of machinery thereover, cleaning, etc.

It is an object of the present invention to provide a new and improved inlet fitting for drain tiles and the like.

It is a further object of the present invention to provide an inlet fitting for drain tiles which greatly increases the amount of water the inlet is capable of accommodating.

A further object of the present invention is to provide an inlet fitting for drain tiles having a greatly improved screening member therein.

It is a further object of the present invention to provide an inlet fitting for drain tiles having an indicator which is quickly adaptable to a variety of uses and conditions.

These and other objects of this invention will become apparent to those skilled in the art upon consideration of the accompanying specification, claims, and drawings.

Referring to the drawings, wherein like characters indicate like parts throughout the figures.

Figure 1:
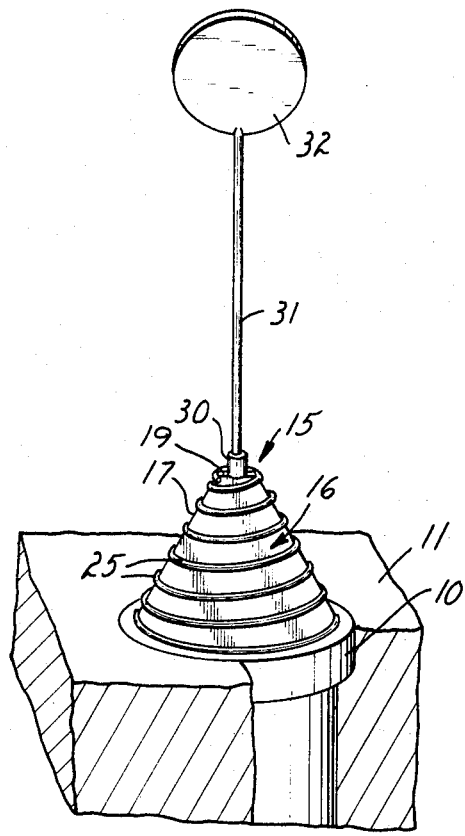
FIG. 1 is a view in perspective indicating the present inlet fitting position in the inlet of a drain tile.
Figure 3:
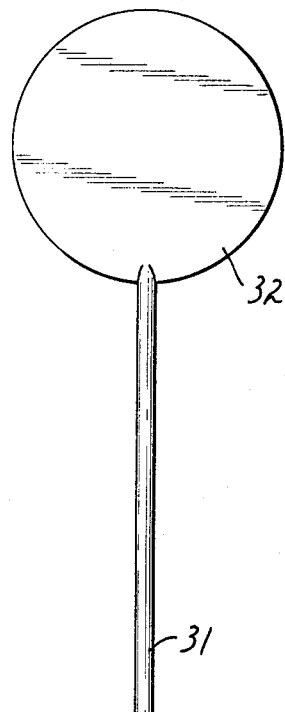
FIG. 3 is a sectional view as seen from the line 3—3 in FIG. 2.
Figure 2:
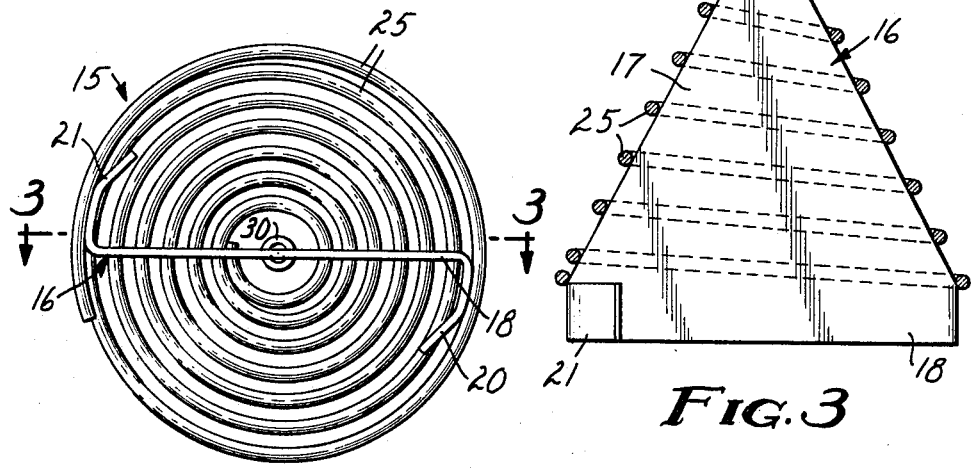
FIG. 2 is an enlarged view of bottom-plan of the inlet fitting illustrated in FIG. 1.

In the figures the numeral 10 designates an inlet for a drain tile, which inlet is approximately level with the surface 11 of the ground. The opposite end of the tile is in communication with a drainage system (not shown), such as a main horizontal tile line, a ditch, etc. An inlet fitting generally designated 15 is illustrated in FIG. 1 correctly positioned within the inlet 10 of the tile. The inlet fitting 15 includes an upright plate 16 comprising a generally triangularly shaped upper portion 17 with its base integrally joined to a rectangularly shaped portion 18. The uppermost angle of the triangularly shaped portion 17 is truncated to form an upper horizontal edge 19. The horizontal length of the rectangular shaped portion 18 is somewhat greater than the length of the base of the triangularly shaped portion 17 so that outwardly extending flanges 20 and 21 are formed at either end thereof. The flanges 20 and 21 are bent outwardly from the plane of the plate 16 in opposite directions to form surfaces which frictionally engage the inner surface of the inlet 10 when the inlet fitting 15 is in place.

An elongated piece of material, such as metal or the like, having a generally circular cross-section is formed into an inverted conically shaped helix 25 and fixedly attached to the upright plate 16 at spaced apart locations along the upright sides thereof by welding, brazing, or the like. The lowermost spiral of the helix extends around the plate 16 at approximately the base of the triangularly shaped portion 17 and forms a stop to prevent the inlet fitting 15 from sliding too far into the inlet 10. It should be understood that while round stock is illustrated in a helical form in the present embodiment many other types of material could be formed into a great variety of shapes which would operate in this device.

Fixedly attached to the upper horizontal edge 19 of the upright plate 16 is an internally threaded hollow cylindrical member 30. The member 30 is fixedly attached to the edge 19 of the plate 16 at one end so that its axis is approximately vertical. While the member 30 as illustrated may be any convenient material, such as a pipe coupling or the like, it should be understood that it could be made in a great variety of shapes and forms any of which will perform the functions to be explained presently.

The lower end of an elongated rod 31 is threadedly engaged in the member 30 and the upper end has fixedly attached thereto an indicator 32, which is in the form of a large disk that may be constructed of any convenient material and may be colored a bright color such as red or the like to clearly indicate the presence of the inlet fitting 15. The member 30 should be constructed so that a rod 31 and indicator 32 can be quickly and easily attached thereto or removed therefrom. The member 30, rod 31 and indicator 32 are constructed so that the rod 31 and indicator 32 are quickly removable so that indicators having different lengths of rod attached thereto may be quickly attached to the member 30 when the inlet fitting 15 is utilized in different locations or conditions. For example, an extra long rod 31 might be utilized in long grass or deep water while a short rod might be utilized where there is no grass at all.

In the operation of the inlet fitting 15 a hammer or the like may be utilized to gently tap the flanges 20 and 21 inwardly to snugly fit the inlet fitting 15 within the inlet 10 so that the lower spiral of the helix 25 rests on the upper edge of the tile. In this position the plate 16 is generally upright and extends approximately diametrically across the inlet 10 with the triangularly shaped portion 17 extending thereabove. When a deep pool of water forms over the inlet 10, due to a storm, etc., the plate 16 will prevent a whirlpool from forming and the water will fall straight into the tile through the inlet 10. Because a whirlpool cannot form the inlet 10 will be able to accommodate approximately three times as much water as it could if a whirlpool were allowed to form. In addition, the greater screening area formed by the helix 25 will greatly reduce the chances of plugging the inlet 10 with foreign material.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:
1. An inlet fitting for drain tiles comprising:
 (a) an upright plate having a generally triangularly shaped upper portion and a generally rectangularly shaped lower portion attached to the base of said upper portion, the base of said upper portion having a length approximately equal to the diameter of the inlet of said tile;
 (b) a portion extending outwardly from either side of said lower portion to form flanges adapted to engage the sides of said inlet to hold said plate rigidly in place;
 (c) an inverted generally conical shaped helical member fixedly attached at spaced apart locations to the upright sides of said plate for preventing relatively large foreign objects from entering said inlet;
 (d) an indicator; and
 (e) means for attaching said indicator to said fitting whereby said indicator extends upwardly therefrom.

2. An inlet fitting for drain tiles as set forth in claim 1 wherein the indicator includes an elongated rod threaded at its lower end and said attaching means includes an internally threaded cylinder fixedly attached to the upper extremities of the upright plate with its axis approximately vertical.

References Cited
UNITED STATES PATENTS

| | | | |
|---|---|---|---|
| 1,644,121 | 10/1927 | Greene | 210—297.1 X |
| 2,494,086 | 1/1950 | Curtis | 210—247 X |
| 2,970,697 | 2/1961 | Larson et al. | 210—456 X |

REUBEN FRIEDMAN, *Primary Examiner.*

F. MEDLEY, *Assistant Examiner.*